June 2, 1953

C. WEDEL 2,640,615

TIRE CARTING DOLLY

Filed Sept. 13, 1950

Inventor

Charles Wedel

By *Clarence A. O'Brien and Harvey B. Jacobson*

Attorneys

Patented June 2, 1953

2,640,615

UNITED STATES PATENT OFFICE 2,640,615

TIRE CARTING DOLLY

Charles Wedel, Minden, Iowa

Application September 13, 1950, Serial No. 184,642

2 Claims. (Cl. 214—332)

The present invention relates to certain new and useful improvements in wheeled vehicles for handling unwieldy truck and automobile tire equipped wheels and has reference in particular to a simple and practical dolly which is expressly and aptly constructed for conveniently carting, lifting, lowering and rotating an unwieldy tire.

Briefly summarized, the invention has to do with a carriage having complemental horizontal and vertical portions, the horizontal portion being adapted to underlie the tread of a tire after latter is jacked up and the vertical portion being adapted to stand in somewhat spaced parallelism outwardly of the tire. Using a single pair of common castors and swivelly mounting these on the carriage at the juncture of the horizontal and vertical portions of the latter, the carriage, through the medium of a suitable handle, may be trundled toward and from the jacked wheel axle. Horizontal and vertical rollers are also provided and these are mounted on the respective horizontal and vertical portions of the carriage and are so related in respect to each other that turning the tire for purposes of lining up the usual hub openings with the hub supported studs may be readily attained.

One object of the invention is to structurally, functionally and otherwise improve upon carts, trucks and the like used for the same purpose by providing one which, by comparison, is characterized by appreciable refinements and improvements.

Another object of the invention is to provide a dolly in which manufacturers and users will find their respective needs fully met, contained and successfully available.

In carrying out a preferred embodiment of the invention novelty is predicated on a pair of spaced parallel tire tread accommodating rollers which are horizontally arranged and an intervening vertical roller, the latter being situated equidistant between the horizontal rollers to coact with one of the side walls of the tire casing thereby providing the desired three-point contact result.

A further feature is thought to reside in a hingedly mounted handle which takes the form of a folding bail and which has an extension handle which is detachable and which bail, when not in use, may be folded to an out-of-the-way position to facilitate carrying the over-all device in an automobile trunk.

Other objects and advantages will become more readily apparent from the following description and the accompanying sheet of illustrative drawings.

In the accompanying drawings wherein like numerals are employed to designate like parts throughout the views.

Figure 1:
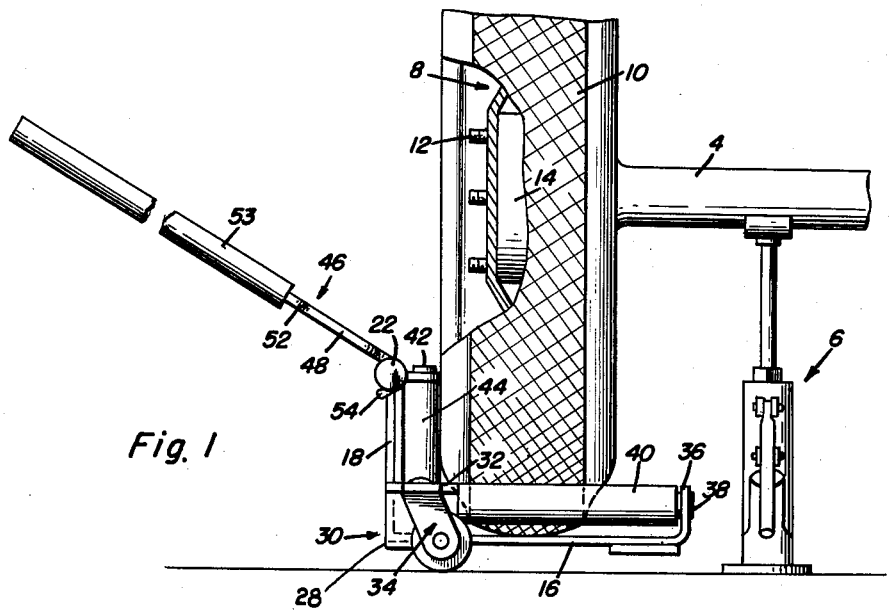
Figure 1 is a view in elevation showing an axle and tire equipped wheel jacked up and showing the improved dolly and the manner in which it is used.

Referring now to Figure 1, the automobile wheel axle is denoted by the numeral 4 and this is shown elevated by an appropriate lifting or hoisting jack 6. The vehicle wheel, which is conventional, is denoted by the numeral 8 and is provided with a pneumatic or equivalent tire 10 the wheel being adapted to be held in place as usual by studs 12 on the hub portion 14. All of these parts are old, obviously.

Figure 2:
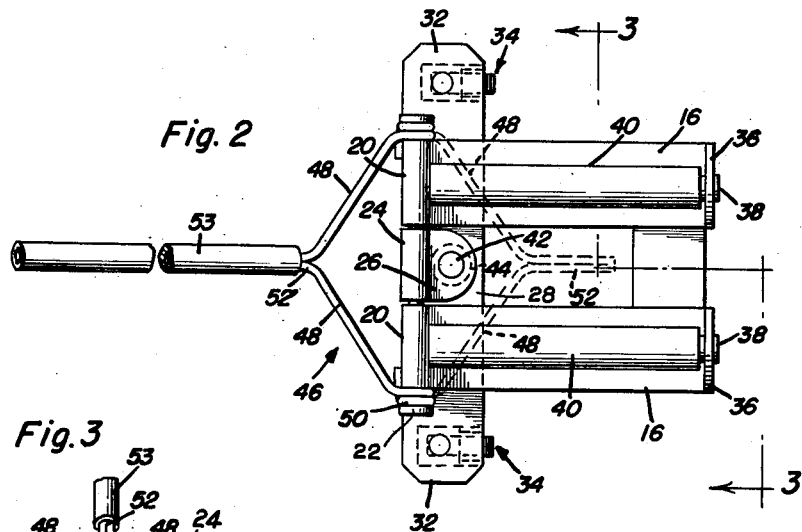
Figure 2 is a top plan view of the dolly by itself.
Figure 3:
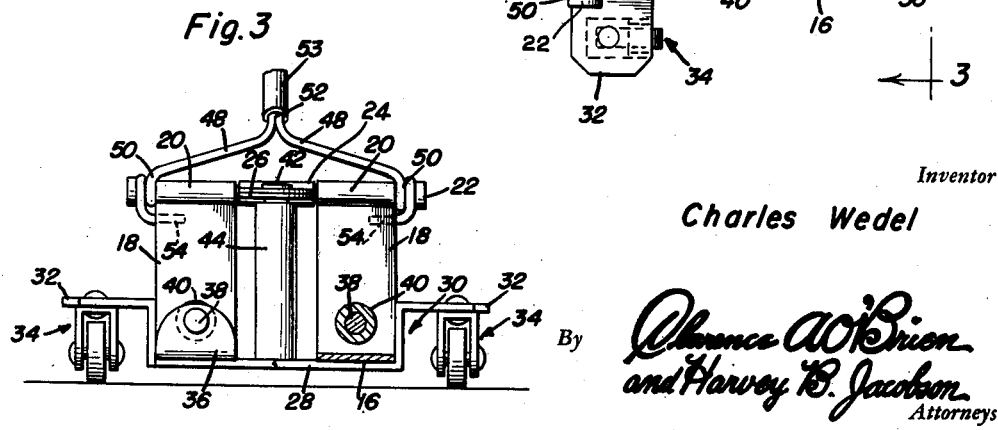
Figure 3 is a view on the irregular line 3—3 of Figure 2 looking in the direction of the arrows.

The improved dolly is characterized essentially by a mobile or wheel supported means embodying a pair of substantially L-shaped units embodying horizontal members 16—16 and vertical companion members 18—18 (see Figure 3). The vertical members are provided with knuckles on their upper ends which knuckles constitute bearings 20—20 for a suitably headed axle pin 22. The pin is journaled in the bearings and the intermediate portion thereof serves as a support for a split sleeve 24 provided with outstanding ears 26. The intermediate portions of the L-shaped units are seated or saddled in the U-shaped stirrup portion 28 (see Figure 3) of the truck 30. The end portions of the truck are fashioned into outstanding ears 32—32 which carry swivelly mounted casters 34—34. The outer ends of the horizontal members 16—16 are turned up and are apertured and said upturned portions 36 serve to support the outer ends of fixed axles 38. These axles are in spaced parallelism above the members 16 and have their opposite end portions secured to and journaled for rotation in bearings provided in the vertical members 18. Sleeves 40 are mounted on the axles 38 and function as idling rollers. These rollers 40 are adapted to extend transversely across the tread portion of the tire 10 in the manner shown in Figure 2 when the dolly is in use. There is a similar vertical axle 42 provided and this has its lower end secured to the stirrup 28 and its upper end fastened to the hinged ears 26. This axle also carries a sleeve which provides a third idling roller 44. By having the horizontal rollers 40—40 to take care of the tread portion and the intermediate vertical roller 44 to accommodate the outer side wall of the tire casing it will be seen that the user may readily revolve the tire while in contact with the several rollers with comparative ease, this for purpose of lining up the bolt holes with the studs 12 in an obvious fashion.

The handle means comprises a wire or equivalent bail 46 the diverging portions 48 of which are fashioned into eyes 50 which are bent around the headed ends of the first named horizontal axle pin 22 as best shown in Figure 3. The shank portion 52 is adapted to accommodate a readily attachable and detachable tubular handle 53 which is, of course, taken off when the dolly is stored away in the owner's automobile trunk or elsewhere. The free ends or terminals of the bail forming handle, that is the terminals 54, are laterally bent as best shown in dotted lines in Figure 3 and are adapted to rest against the uprights or vertical members 18. When they are against the vertical members the handle is then in its position ready for use. By removing the handle extension 53 and swinging the terminals 54 out of contact with the vertical members 18 and swinging the bail over to the dotted line position shown in Figure 2 it then takes an out-of-the-way position for easy carrying purposes.

Novelty is predicated on the stirrup like truck which supports the horizontal and vertical portions of the main carriage and which has outstanding ears carrying casters to facilitate trundling, carting and otherwise maneuvering and handling the overall dolly. Further novelty is predicated on the triple idling roller arrangement with the horizontal and vertical rollers with the respective rollers arranged to simultaneously contact with the tread and side wall portions of the tire casing.

In using the device it will be understood that it is necessary to first elevate the tread of the tire clear of the ground or other surface. This is done by jacking up the axle and wheel assembly as shown by the lifting jack 6 in the Figure 1. Now with the handle means arranged as shown in full lines in Figure 1 the dolly may be shoved or otherwise carted into place. By shoving the horizontal portion of the carriage beneath the tread the idling rollers 40—40 are then in readiness for operation. The rollers are shoved sufficiently under the tread of the tire to bring the remaining companion or third roller 44 into place. This resides in contact with the side wall of the tire casing. Now with the tire casing and wheel well cradled and balanced in the dolly, the handle means is tilted down and the dolly is lifted up to slightly elevate the tire and wheel assembly sufficiently to enable same to be detached from the hub means and carted away for repairs or other purposes. The same operation is followed in carting the wheel assembly and tire back to place. However, in this instance it may be necessary to either raise or lower the dolly by tilting it in a well known manner. The several idling rollers always come in handy in making sure that the stud holes in the disk wheel are lined up properly with the fixed studs on the hub means 14.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A dolly comprising a pair of side-by-side substantially L-shaped units, each unit having duplicated horizontal and vertical members, the latter being disposed in spaced parallelism and being in a common plane, a wheel supported means supporting said L-shaped units in fixed positions relative to one another, a pair of spaced parallel horizontally disposed rollers disposed in spaced parallelism and in a common plane and mounted for free idling rotation in bearings provided therefor in said L-shaped units, said rollers being located above and in spaced parallelism with the horizontal members of the respective units, the upper ends of the vertical members of said units having bearings, a pin mounted in said bearings, sleeve means mounted on the intermediate portion of said pin, and a third roller, said third roller being vertically disposed and located between adjacent ends of said horizontal rollers and being supported in part by said wheel supported means and in part by said sleeve means.

2. A tire carting dolly comprising a truck embodying a U-shaped stirrup portion having casters swivelly mounted at opposite ends of said stirrup portion, a pair of side-by-side substantially L-shaped units having horizontal members and vertical members, the latter arranged in opposed spaced parallelism, the outer ends of said horizontal members being directed upwardly and providing bearings, horizontal axles journaled in said bearings at corresponding ends and journaled in other bearings in the vertical members at their opposite corresponding ends, first and second rollers carried by the respective axles, the upper ends of the vertical members of said units being provided with a horizontal pin and said pin spanning the space between the respective vertical members, a third roller vertically disposed and having its lower end portion mounted for rotation in said stirrup portion and having its opposite upper end rotatably connected with the intermediate portion of said pin.

CHARLES WEDEL.

References Cited in the file of this patent

UNITED STATES PATENTS

| Number | Name | Date |
| --- | --- | --- |
| 2,070,986 | Foss | Feb. 16, 1937 |
| 2,332,443 | Roringer | Oct. 19, 1943 |
| 2,490,233 | Schildmeier | Dec. 6, 1949 |
| 2,514,781 | Miller | July 11, 1950 |
| 2,537,166 | Snyder | Jan. 9, 1951 |
| 2,545,440 | Barber | Mar. 20, 1951 |
| 2,546,509 | Huff | Mar. 27, 1951 |

FOREIGN PATENTS

| Number | Country | Date |
| --- | --- | --- |
| A. D. 1,495 | Great Britain | Jan. 20, 1910 |